April 29, 1924.  
B. W. MILLER  
AUTOMOBILE SIGNAL DEVICE  
Filed May 4, 1920  
1,492,546  
3 Sheets-Sheet 2
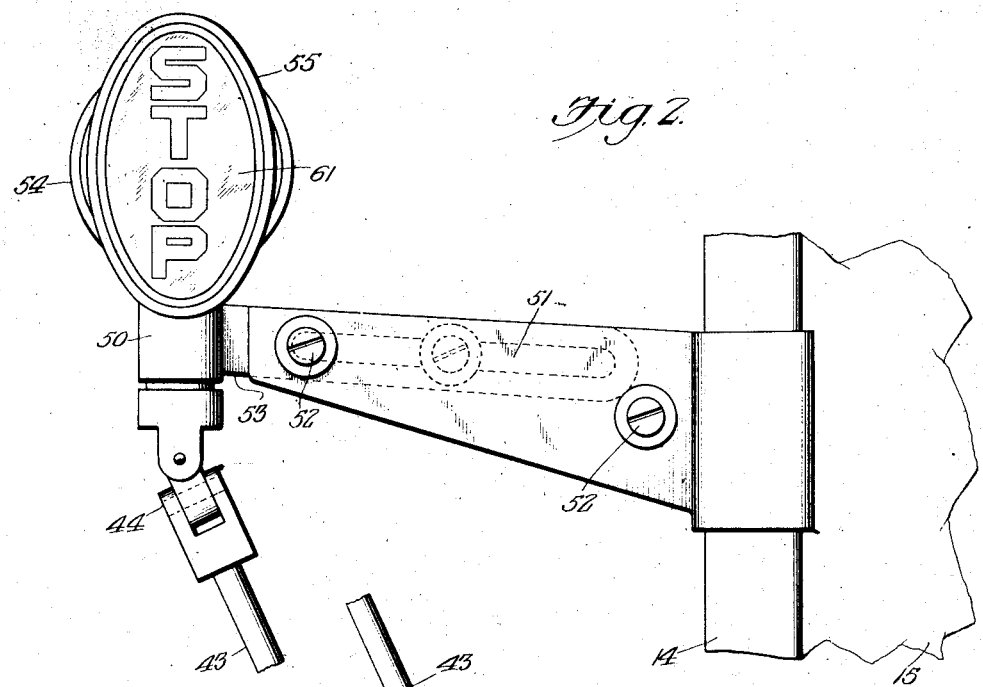
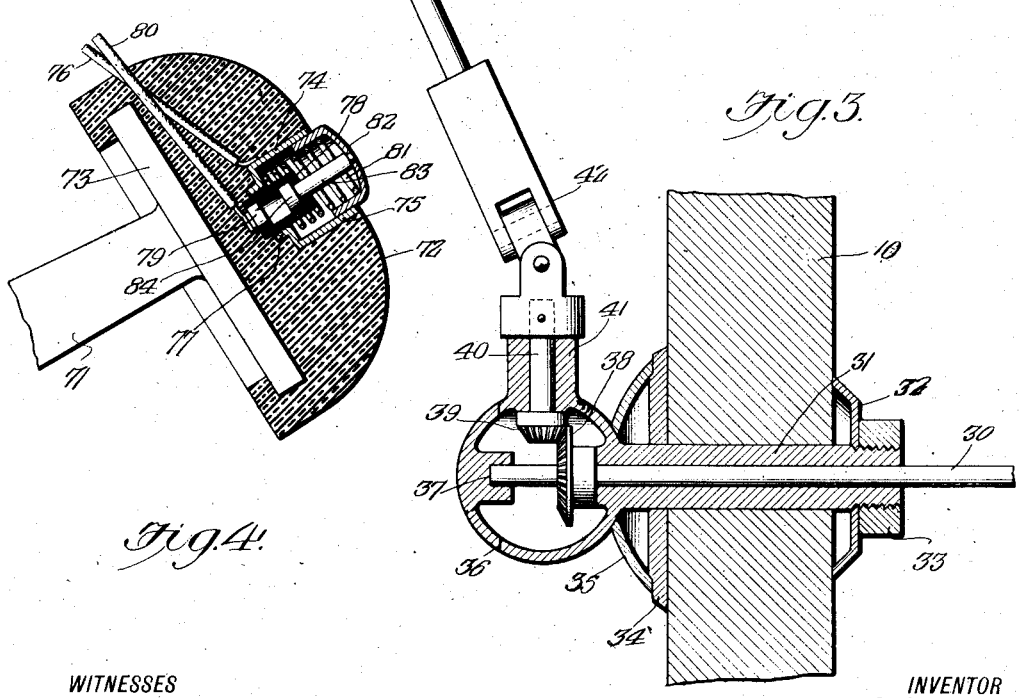
WITNESSES  
J H Crawford
INVENTOR  
B.W.Miller,  
BY  
ATTORNEYS April 29, 1924.
B. W. MILLER
AUTOMOBILE SIGNAL DEVICE
Filed May 4, 1920
1,492,546
3 Sheets-Sheet 3
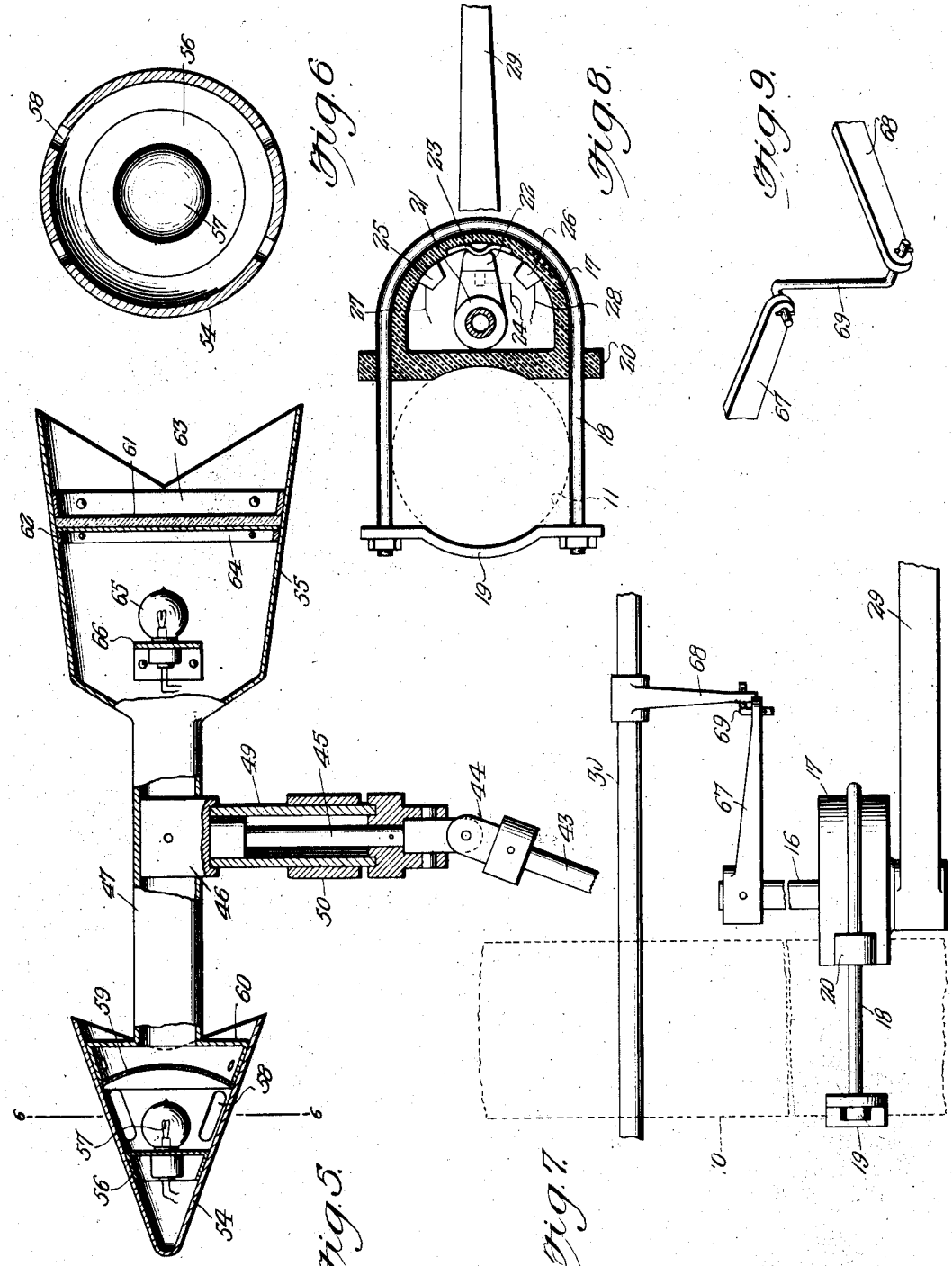
WITNESSES
INVENTOR
B. W. Miller;
BY
ATTORNEYS Patented Apr. 29, 1924.

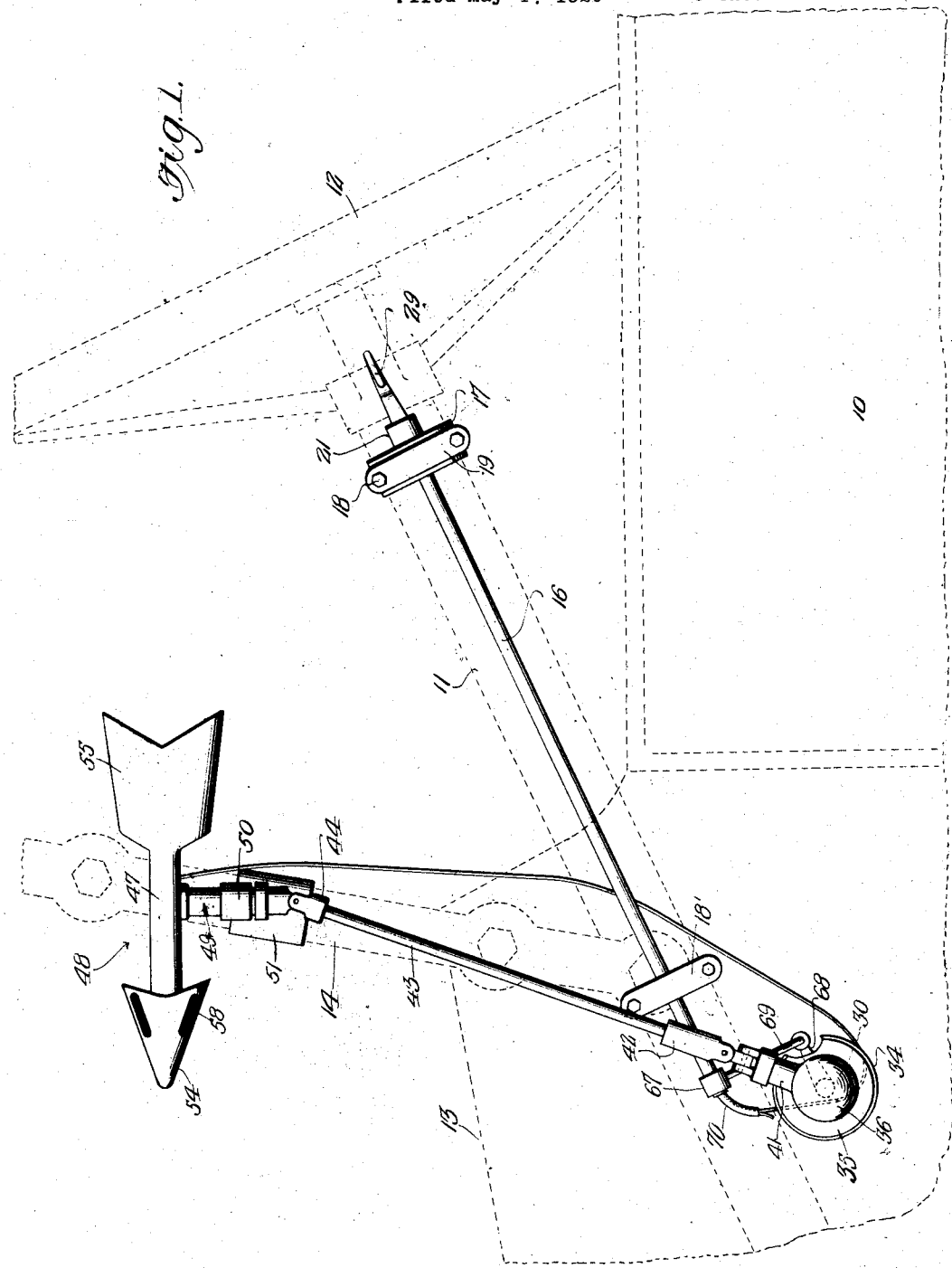

1,492,546

UNITED STATES PATENT OFFICE.

BERL WILSON MILLER, OF BOISE, IDAHO, ASSIGNOR OF ONE-HALF TO JOHN D. HEINEN, OF BOISE, IDAHO.

AUTOMOBILE SIGNAL DEVICE.

Application filed May 4, 1920. Serial No. 378,768.

*To all whom it may concern:*

Be it known that I, BERL WILSON MILLER, a citizen of the United States, and a resident of Boise, in the county of Ada and State of Idaho, have invented a new and useful Improvement in Automobile Signal Devices, of which the following is a specification.

My invention has reference to signal devices or direction indicators for automobiles and particularly an improvement on the structure shown in my prior Patent 1,266,702 of May 21, 1918.

An important object of the invention is to provide an improved direction indicator or signal device adapted particularly for use in connection with automotive vehicles and which is operated without removing the hands from the steering wheel so as to indicate to other drivers and pedestrians the direction in which the vehicle is to turn, the device embodying signal arrows mounted at the sides of the windshield or body of an automobile and further, adapted to be operated simultaneously with the application of the brake through the medium of the ordinary foot-brake-pedal so as to indicate that the car is to stop, simultaneously with the braking of the car.

A further important object of the invention is to provide an apparatus of the above character which may be installed upon an automotive vehicle, preferably an automobile or truck, without materially altering the construction thereof and to be so located upon said vehicle as to be plainly visible day and night to all traffic officers, pedestrians and operators of other vehicles, whether approaching from the right, left, front or rear, and which is protected against being spattered with dirt or mud, as is the case with devices arranged for attachment at the front and rear of an automobile.

A further object of the invention is to provide an apparatus of the above mentioned character which is simple in construction, ornamental in appearance, inexpensive to manufacture, convenient in use and not liable to derangements.

A still further object of the invention is to provide means to illuminate the visual signals so that the apparatus may be used at night.

Other objects and advantages of the invention will be apparent during the course of the following description.

In the accompanying drawings:

Figure 1 is a fragmentary side elevation of an automobile indicated in phantom, with the improved signal device applied thereto, Figure 2 is a fragmentary rear elevation of one of the visual signals or indicators, Figure 3 is an enlarged fragmentary vertical, sectional view through one side of the car body and illustrating the driving arrangement, Figure 4 is a sectional elevation of the foot pedal and switch applied thereto for controlling the signals simultaneously with the application and release of the brakes, Figure 5 is an enlarged longitudinal sectional view, partly in elevation, of one of the signal arrows and adjacent operating connections, Figure 6 is a transverse sectional view taken on the line 6—6 of Figure 5, Figure 7 is a fragmentary plan view showing a connection between the operating shaft and transverse shaft to which the indicators are operatively connected, Figure 8 is an enlarged sectional view showing the switch device mounted on the steering column, and Figure 9 is a perspective view showing fragmentary portions of the connection illustrated in Figure 7.

Referring to the drawings in detail in which like reference characters designate corresponding parts throughout the several views, there is shown the body 10 of an automobile which is equipped with the usual steering column or standard 11 having a steering wheel 12, while 13 designates the hood above and in rear of which is arranged the windshield 14 having the usual transparent panel 15, said windshield having the usual frame. Arranged along the steering column is a tubular shaft 16, the upper end of which passes through a switch box 17 clamped to the steering column by a clamp 18 preferably composed of a U-shaped bolt and a strap member 19 embracing the steering column and securing the switch box 17 against the column. A clamp 18' also secures the shaft 16.

As illustrated, the switch box is provided with apertured flanges 20 for receiving the sides of the bolt therethrough in order that the latter may straddle the column, while the box and the strap are recessed to accommodate the column. Within the hollowed out portion of the switch box 17 and upon the tubular rod or shaft 16 is a stub shaft 21 carrying a pivotal contact arm 22 arranged to cooperate with a spring 23 carried by the switch box cap so as to hold the contact in an intermediate position and in addition form a switch for closing the circuit through a conductor 24 to the signal devices as will be hereinafter more fully set forth.

At either side of the spring contact 23 are arranged stationary contacts 25 and 26 from which lead conductors 27 and 28, the stationary contacts being co-operative with the movable contact so as to indicate the proper direction when the signal devices or pointers are turned to the right or left as will be further explained. In order to operate the tubular rod or shaft 16 from the steering wheel without removing the hands therefrom, the stub shaft 21 carries a hand lever 29 arranged to extend in close proximity to the rim of the steering wheel and also to provide sufficient leverage whereby the shaft may be easily turned.

Extending across the front of the body, preferably through the hood, at or about the dashboard and windshield, is a transverse shaft 30, the same passing through bearing sleeves or bushings 31 in the sides of the body for free rotation. These sleeves have engaged on their inner ends, washers 32 retained in position by nuts 33 mounted on the threaded inner ends of the sleeves, although I desire to have it understood that any suitable securing means may be employed for this purpose. Pads 34 are mounted on the sleeves against the faces of the body sides so as to protect the latter, while washers 35 are interposed between the said pads and the gear housings 36 formed at the outer ends of the sleeves and in which the ends of the shaft 30 have bearing as indicated at 37. These gear housings are preferably of globular formation and suitably constructed as to render the interior parts accessible as well as to permit lubrication thereof, and mounted on each end of the shaft 30 are bevel gears 38 meshing at correspondingly located sides of pinions 39 secured to the lower ends of short vertical shafts 40 rotatable in the sleeve extensions 41 of the gear housings and which extend vertically therethrough. Connected to the shafts 40 through the medium of universal joints 42 are upwardly and outwardly extending driven shafts 43 which are in turn connected through the medium of universal joints or connections 44 with vertical shafts 45 having connection at their upper ends through the medium of sleeves 46 with the shank portions 47 of suitable direction indicators in the form of arrows 48. The shafts 45 extend through bushings 49 which are rotatable in bearing sleeves 50 mounted at the outer ends of brackets 51 detachably secured to the sides of the windshield and adapted to be vertically adjusted thereon. These brackets are in the form of split-jaw clamps connected by bolts or the like 52 and including an adjustable section 53 by which the projection of the arms or brackets from the sides of the windshield, as well as the location of the pointers, may be regulated as desired.

The arrows are in the form of visual signals being preferably provided with hollowed-out heads 54 and hollowed tail portions 55. Mounted in the head portion is a partition 56 carrying an electric light bulb 57 which is visible through the openings 58 while a reflector 59 is mounted at the adjacent end of the shank portion of the arrow where the latter is flanged for securing the arrow head thereto as indicated at 60, it being understood that the transparency of the arrow results in the production of a visual signal device although the rays of light may be projected through the elongated openings 58 clearly shown in Figures 5 and 6 of the drawings in order to render the signals clearly discernible to traffic officers, pedestrians and operators of other vehicles, whether approaching from the right, left, front or rear.

At the tail portion of the arrow there is provided a lens 61 in back of which is disposed a stop signal plate 62, the latter being preferably red colored celluloid with the transparent sign "Stop". The lens and plate are retained in position by rings or the like 63 and 64 suitably secured to the wall of the arrow and as will be seen in Figure 2 of the drawings, the sign presents an oval appearance from the rear, the extension or elongation being vertical and the sign being illuminated through the medium of an electric light bulb 65 retained in a support 66 disposed across the tail portion of the arrow constituting the indicator or signal device proper. It is, of course, to be understood that the arrow is free to turn on a vertical axis which constitutes the spindle thereof as clearly shown and described in connection with Figure 5 of the drawings.

In order that rotation may be imparted to the shaft 30 and thus to the shafts 43 whereby the arrows may be turned in a correlated direction, the lower end of the control lever tube or shaft 16 is provided with a crank arm 67 and the free end thereof is connected to the free extremity of a crank arm 68 carried by the shaft 30 and extending substantially at right angles with respect to the crank arm 67, through the medium of a bell-crank-lever or link connection 69 which is particularly shown in Figures 7 and 9 of the drawings. The extremities of the link 69 are extended at right angles to each other and pass through apertures in the free ends of the crank arms 67 and 68 so as to allow free pivotal movement of the parts, while resulting in partial rotation or oscillation of the shaft 30 upon the shaft 16 being turned through the medium of the control lever 29. By this means the arrows may be turned to the right or left to indicate a turn in the corresponding direction and when so doing the movable contact or blade 22 will be brought into engagement with one of the stationary contacts 25 or 26 and thus close the circuit through the light bulbs 57 and 65 whereby the arrows or pointers are illuminated and rendered clearly discernible.

It is to be understood that this operation may take place simultaneously with the turning of the steering wheel or prior thereto by manipulation of the control lever 29 without removing the hands from the steering wheel. The electrical circuit including the lamps and the switch contacts is traced through the conductors 24 and 27 or 28, which form a duplex wire which is extended through the tubular shaft 16 as indicated at 70 in Figure 1 of the drawings, the wires leading to the lamps 57 and 65 and to a switch device arranged upon the foot-brake-pedal 71 as indicated in Figure 4 of the drawings. As shown, a rubber or like cushion cap 72 is applied to the tread portion 73 of the pedal, being flanged or otherwise detachably secured thereover. This cushion is provided with an axial recess 74 receiving a casing 75 to which is connected one of the conductors 76 leading to the batteries or other suitable source of electrical energy and the illuminating means of the visual signals produced by the electric light bulbs 57 and 65. The casing 75 is of current conducting material and has a reduced internally threaded portion 77 having detachably mounted therein an insulated bushing 78 at the lower end of which is disposed a stationary contact plug 79 from which a conductor 80 extends, said conductors being disposed through the cushion or otherwise suitably located. Within the casing and around the bushing 78 is an expansible helical spring 81 acting upon a depressible cap 82 which is provided with an axial contact pin 83, arranged within a plunger 84 movable in the bushing 78 so that upon depression of the cap against the action of the spring the movable contact may be brought into engagement with the stationary contact to close the circuit through the illuminating means without turning the arrows and thus to illuminate the stop signal at the rear for the benefit of approaching drivers when the brakes are applied to bring the car to a stop or in slowing down the speed of the car. By this means the stop signals will be ignited simultaneously with the application of the brakes and without the necessity of employing separate switch devices requiring displacement of the foot or hands from the ordinary instruments of control for the car, thus obviating complication in the operation of the car and signal devices, avoiding accidents and rendering the structure extremely simple and economical to produce.

In view of the foregoing it is thought that the operation of the device will be readily understood and in view of its simplicity and practical value, that it will readily commend itself to those skilled in the art and to drivers of cars generally.

Having thus described my invention, what I claim is:—

1. An operating signal device for automobiles comprising a shaft extending across the vehicle, means at the sides of the vehicle rotatably supporting the shaft, a control lever mounted on the steering column of the automobile and having a shaft extending along the latter, means carried by the column for rotatably retaining the shaft thereon, connections between the lower end of the second named shaft and the first named shaft whereby the latter will be turned upon the turning of the lever, adjustable and extensible clamps adapted to engage the sides of the wind shield frame of the automobile, signal carrying elements rotatable in said clamps outwardly offset from the wind shield frame sides, universal shaft connections between the ends of the first named shaft and said elements whereby operation of the control lever will result in turning of the signals for signaling purposes.

2. A signal device for automobiles comprising a shaft extending across the vehicle, means at the sides of the vehicle rotatably supporting the shaft, a control lever mounted on the steering column of the automobile and having a shaft extending along the latter, means carried by the column for rotatably retaining the shaft thereon, connections between the lower end of the second named shaft and the first named shaft whereby the later will be turned upon the turning of the lever, adjustable and extensible clamps adapted to engage the sides of the wind shield frame of the automobile, signal elements comprising spindles rotatable in said clamps, universal shaft connections between the ends of the first named shaft and said spindles whereby operation of the control lever will result in turning of the signal elements, and means associated with the control lever to yieldingly hold the same in position for maintaining the signal element in non-signaling position.

3. A signal device for automobiles, comprising brackets adapted to be attached to the sides of a wind shield and adjusted therein, signal carrying elements comprising spindles designed to turn in the brackets, an operating lever mounted on the steering column adjacent to the steering wheel, operative connections between the spindles of the signal carrying elements and the operating lever whereby the said elements may be turned in either direction, and stop means associated with the control lever whereby its movement in either direction is limited to a predetermined degree.

4. A signal element comprising a casing conforming to the shape of an arrow, the tail portion having its rear end open, a lens mounted therein and an electric lamp mounted forward to said lens, said head portion having its side faces provided with openings, and a reflector and electric light mounted within said head portion and adapted when the electric lamp is energized to project rays of light through said openings, the electric lamps of the head and tail portions being located in separate and independent compartments.

5. A signal element in the form of an arrow comprising a hollow casing divided by partitions into head and tail compartments, openings in the sidewalls of the head compartment and illuminating means in the head compartment, the rear end of the tail compartment being closed by a "stop" signal lens and an illuminating means in the tail compartment whereby the "stop" signal may be illuminated independently of the head signal and vice versa.

BERL WILSON MILLER.